United States Patent
Grossard et al.

(10) Patent No.: US 7,577,322 B2
(45) Date of Patent: Aug. 18, 2009

(54) OPTICAL INTEGRATED CIRCUIT COMPRISING A LIGHT GUIDE FORMING AT LEAST ONE OPTICAL SEPARATION

(75) Inventors: Nicolas Grossard, Besançon (FR); Jérôme Hauden, Besançon (FR); Henri Porte, Serre les Sapins (FR)

(73) Assignee: Photline Technologies, Besancon (FR)

( * ) Notice: Subject to any disclaimer, the term of this patent is extended or adjusted under 35 U.S.C. 154(b) by 71 days.

(21) Appl. No.: 11/915,359

(22) PCT Filed: May 24, 2006

(86) PCT No.: PCT/FR2006/050480

§ 371 (c)(1),
(2), (4) Date: Nov. 23, 2007

(87) PCT Pub. No.: WO2006/129035

PCT Pub. Date: Dec. 7, 2006

(65) Prior Publication Data

US 2008/0193077 A1    Aug. 14, 2008

(30) Foreign Application Priority Data

May 25, 2005    (FR) .................................. 05 51376

(51) Int. Cl.
*G02B 6/12* (2006.01)
*G02B 6/26* (2006.01)
*G02B 6/30* (2006.01)

(52) U.S. Cl. .............................. 385/14; 385/43; 385/49; 385/129; 385/130

(58) Field of Classification Search .................. 385/14, 385/43, 45, 49, 22, 129–132; 356/477
See application file for complete search history.

(56) References Cited

U.S. PATENT DOCUMENTS 4,389,567 A    6/1983    Khoe et al.

(Continued)

FOREIGN PATENT DOCUMENTS

DE    4225085    2/1994

(Continued)

OTHER PUBLICATIONS

Vinchant J-F et al., "INP Digital Optical Switch Guided-Wave Photonic Switching", Oct. 1, 1993, pp. 301-307.

*Primary Examiner*—Frank G Font
*Assistant Examiner*—Michael P Mooney
(74) *Attorney, Agent, or Firm*—Young & Thompson

(57) ABSTRACT

An optical integrated circuit with waveguide separation on a substrate includes at least one separating unit, including an optical input/output interface in relation with an external light wave guide, the interface extending in the circuit through an optical guiding input section extended by at least two optical guiding branches mutually spaced apart substantially symmetrically relative to the general direction of the input section. The input section includes as many optical guides as branches, adjacent input section optical guides being substantially rectilinear and mutually parallel, two adjacent optical guides of the input section being separated by an aperture of width D, the refractive index of the opening being lower than that of the optical guides, each input section optical guide having a determined width We1, each branch optical guide exhibiting a width increasing in the direction away from the input section from the width We1 up to a determined width Ws.

20 Claims, 4 Drawing Sheets

U.S. PATENT DOCUMENTS 5,461,684 A * 10/1995 Vinchant et al. .............. 385/22
2002/0038900 A1   4/2002 Yamauchi

FOREIGN PATENT DOCUMENTS

| EP | 0716336 | 6/1996 |
|---|---|---|
| EP | 1318420 | 6/2003 |
| JP | 04355714 | 12/1992 |
| JP | 11352347 | 12/1999 |
| JP | 2000180646 | 6/2000 |

* cited by examiner (Previous art)

(Previous art)

(Previous art)

OPTICAL INTEGRATED CIRCUIT COMPRISING A LIGHT GUIDE FORMING AT LEAST ONE OPTICAL SEPARATION

The present invention relates to an optical integrated circuit comprising a light guide forming at least one optical separation, said circuit being commonly implemented in devices called separator or recombinator according to the modalities of use but which may also be implemented in interferometrical devices. It finds application in optics, in particular for routing light beams.

The optical separators/recombinators, in particular of the type commonly called Y-junction, are essential elements in integrated optical circuits. These separators are in particular used as optical power divider in active (Mach-Zehnder type intensity modulators) and passive integrated components (separators 1 toward N).

An optical guide is a structure formed at least of a central portion, called core, with higher refractive index as its neighbouring sections, called sheathes. The particularity of an optical guide is to be able to channel light on a determined path. The parameters of the optical guide (core width, difference in the refractive index between the core and the sheathes) define the number of solutions enabling to guide the light. By monomode optical guiding is meant a single propagation solution and consequently a single possible transversal distribution of the guided optical field. In such a case, the guided optical wave is called fundamental optical mode. When there are several solutions for the guiding equation, there are then higher order optical modes whereof the transversal distributions of the optical field are alternately symmetrical and anti-symmetrical. These higher order modes propagate at different speeds in the optical guide which may generate spurious interference phenomena, sources of optical instabilities. Generally speaking, the operation of the Y-junction may be interpreted from the evolution of the guided and radiating optical modes during the propagation of light. It may be referred to article of H. Yajima, <<Coupled mode analysis of dielectric planar branching waveguide", IEEE Journal of Quantum Electronics, vol. 14, n°10, Oct. 1978, for more details pertaining to this matter.

A Y-junction may be characterized by several quality criteria, in particular optical losses, optical balance between the output branches, space requirements and wavelength stability, preferably the best possible. Still, for the reasons stated below, it is difficult to obtain good features for all these criteria.

Figure 1:
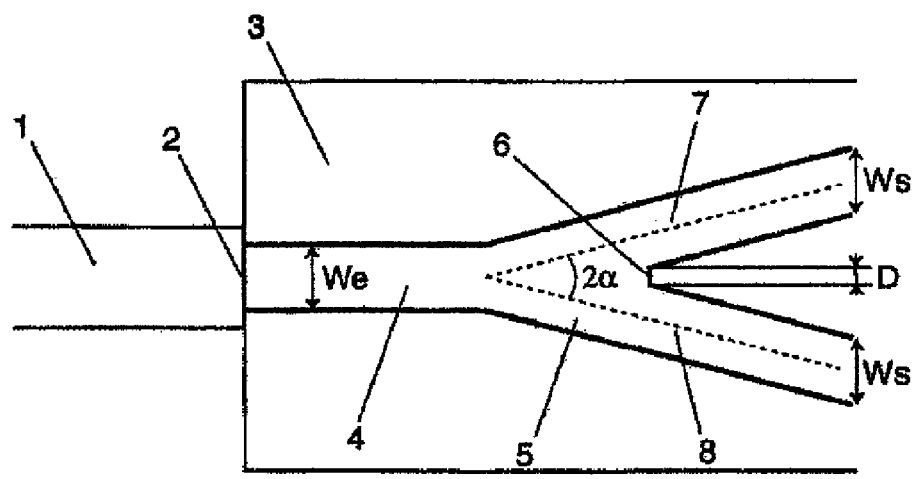

FIG. 1 of the state of the art represents diagrammatically a device implementing an optical fiber coupled to an integrated optical circuit with a conventional Y-junction. The guided optical wave coming from the optical fiber 1 is injected at the interface 2 at the input to the integrated optical circuit whereof the optical guide is manufactured on a planar substrate 3. The optical wave coupled to the interface 2 between the media 1 and 4 propagates first of all through a common optical guide 4 or common trunk 4 before passing through a "taper" zone 5, which will be called therebelow conical zone, and whereof the width varies gradually from We toward 2 Ws+D. This conical zone 5, ending at a discontinuity 6 between diverging independent branches 7 and 8, forms a geometrical preparation at the optical separation between the optical guides of the branches 7 and 8 called respectively upper and lower branches, oriented by an angle ±α relative to the propagation axis of the guide in its common portion or common trunk 4. The discontinuity 6 of width D is a consequence of the limitations in resolution of the manufacturing technological processes. In practice, this discontinuity has sizes of the order of the micrometre possibly tenth of micrometre.

In a conventional Y-junction device as that represented on FIG. 1, the mechanism of the losses and optical instabilities appears mainly in three locations. First of all at the interface 2 because of the shape dis-adaptation between the input optical field, that of the fibre 1, and the fundamental optical mode supported by the common trunk 4. Then on the discontinuity 6 where the fundamental optical mode may be coupled to the higher order or radiating optical modes because of the discontinuity 6 in propagation. Finally, along the branches 7 and 8 because of the separation angle 2α between both branches.

The losses at the interface 2 may be increased by using an adaptation "taper" between both optical modes. As regards the stability in the common trunk 4 preceding the separation between the branches, the width We is adjusted so as to support only the fundamental optical mode. As explains the article of A. Klekamp, P. Kersten and W. Rehm, "An improved single-mode Y-branch design for cascaded 1:2 splitters", Journal of Lightwave Technology, vol. 14, n°12, Dec. 1996, the balance stability at the Y-junction output is increased while reducing the width of the common trunk 4 on a certain rectilinear portion called monomode spatial optical filter. Indeed, in the case of an imperfect injection, the external optical wave coming from the fibre 1 being injected with an angle and a transversal overlay relative to the common trunk 4, a fraction of the upper optical mode of order 1 (anti-symmetrical) may be excited with the fundamental optical mode in the common trunk 4. If the width We is sufficiently small for the optical guide to be strictly monomode, the spurious optical mode is diffracted in the substrate 3 during the propagation in the common trunk 4 before reaching the conical zone 5. The structure is then more stable in actual conditions of use.

At the discontinuity 6 and the branches 7 and 8, the optical losses and the stability of the Y-junctions may be increased if the separation angle becomes very small (typically 0.1°) since the adiabatics of a Y-junction are sensitive to the separation angle 2α. When this angle approximates 0°, the optical behaviour of the junction stabilizes and the optical losses diminish. However, this reasoning does not respect the space requirement criterion since the lengths of the branches necessary with such angles to provide sufficient separation of the branch optical guides are rapidly prohibitive. In practice, a 14.3 mm longitudinal space requirements should be accounted for a 0.1° angle and a 25 μm final separation between the centres of the output branches. Moreover, the discontinuity 6 in the conical zone 5 generates an excitation of the higher order optical modes detrimental to the stability of the Y-junction, this even in the case of an adiabatic aperture. Indeed, the end portion of the conical zone 5 is still characterized by a significant guide width 2 Ws+D capable of supporting several modes of higher optical order.

Figure 2:
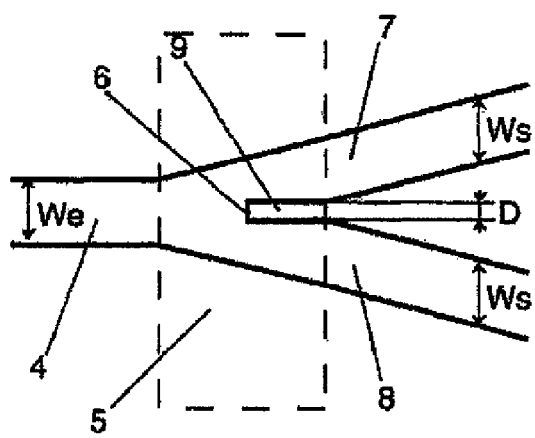

To limit such problem, it has been suggested in the patent application WO97/32228 a solution which is represented on FIG. 2 of the state of the art. The Y-junction is characterized therein by an overlay of the discontinuity 6 toward the inside of the conical zone 5 by creating an aperture 9 having a lower index than the core of the optical guide. However, this solution does not suppress satisfactorily the excitation of the higher order optical modes and the optical losses. Moreover, the geometrical space requirements is not reduced relative to a conventional Y-junction.

For improvement purposes, the solution presented into the patent application WO02/071112 of D. Sciancalepore and S. Renoldi and represented on FIG. 3 of the state of the art, offers to truncate the conical zone in its first portion qui is a source of optical instabilities and of useless space requirements according to the authors. With the latter solution, the discontinuity 6 coincides with the transition zone between the common trunk 4 and the branches 7 and 8. The widths of the branches 7 and 8 at the input to the conical zone and the parameters D are adapted so as to create a continuity of the optical fields between the common trunk 4 and the input of the conical zone 5. It is explained in WO02/071112 that the discontinuity of the optical guide appears at a portion studied for being monomode, which increases the stability of the Y-junction.

In spite of this improvement and all the precautions taken, the discontinuity between the common trunk 4 and the conical zone 5 remains a potential source of losses and of optical instabilities by coupling on radiating optical modes and higher order optical modes.

A number of other documents of the field of the invention are also known.

Thus, document EP-0716336A and the article of VINCHANT J. F and al. <<INP DIGITAL OPTICAL SWITCH GUIDED-WAVE PHOTONIC SWITCHING" IEE proceedings J. optoelectronics Vol. 140 N. 5 part J p. 301-307 show a structure with discontinuous optical guides and with an input common trunk.

Document JP-11-352347 shows an optical structure whereof the optical guides must support both first optical modes, involving a dependence on the wavelength and the polarization contrary to the present invention which will be presented below and wherein an adiabatic modal evolution of the fundamental mode is implemented and not a coupling between both first optical modes as in this document.

Documents JP-04-355714 and DE-4225085 still appear based upon a coupling of optical modes same as for the previous document.

Finally, document JP-2000-180646 shows a structure with discontinuous waveguides or with other complex conformations involving optical losses in particular by diffraction.

The present invention offers to suppress this discontinuity problem which is responsible on the one hand for optical losses and on the other hand optical instabilities in the Y-junction. The solution suggested consists in translating the discontinuity encountered at the conical zone toward and at the interface making the connection with the external medium, hence on the input to the optical guiding common trunk. In such a case, the common trunk forming the initial trunk of the Y-junction forms a preform at the optical separation, which guarantees by a geometrical construction a continuity of the optical field propagated at the separation of the branches.

Thus, the invention relates to an optical integrated circuit with waveguide separation on a substrate, the circuit comprising at least one optical separating unit, the unit comprising an optical input/output interface intended for being in relation with an external means for guiding a light wave, the interface extending in the circuit through an optical guiding input section of determined length $L1$ extended by at least two optical guiding branches mutually spaced apart substantially symmetrically relative to the general direction of the input section.

According to the invention, the input section includes as many optical guides as there are branches, (each branch extends from an optical guide of the input section) the optical guides of the input section being substantially rectilinear and mutually parallel, two adjacent optical guides of the input section being separated by an aperture of determined width $D$, the refractive index of the opening being lower than that of the optical guides, each optical guide of the input section having a determined width $We1$, and each branch optical guide exhibits a width increasing in the direction away from the input section from the width $We1$ up to a determined width $Ws$.

In various embodiments of the invention, the following means which may be used single or according to all technically possible combinations, are used:

the unit includes moreover a transition zone of length $L0$ between the interface and the input section, wherein the transition zone includes optical guides extended from those of the input section, each of the optical guides of the transition zone having a width increasing in the direction away from the interface from a determined width $We0$ up to the width $We1$, and in that the opening between two adjacent optical guides of the transition zone has a width increasing in the direction away from the interface from a determined width $D'$ up to the width $D$.

the widths $We1$ and $Ws$ are equal, the optical guides of the branches having constant widths along their paths, the variation in width of the optical guides of the branches is linear in relation to the distance of propagation.

the length $L1$ of the input section ranges between 0 and 10 mm.

the semi-angle $\alpha$ for separating the branches ranges between $0.1°$ and $0.50°$ and preferably about $0.175°$, (the angle for separating the branches is $2\alpha$)

the external guiding means is an optical fiber bonded to the interface of the integrated optical circuit, the substrate of the optical integrated circuit is selected among glass, a semi-conductor, a polymer, a ferroelectric material in particular lithium niobate ($LiNbO_3$) or lithium tantalate ($LaTiO_3$), the substrate of the optical integrated circuit is selected lithium niobate ($LiNbO_3$) or lithium tantalate ($LaTiO_3$), the substrate of the optical integrated circuit is made of lithium niobate ($LiNbO_3$), the substrate of the optical integrated circuit made of lithium niobate ($LiNbO_3$) is in X cross-section,
    the substrate of the optical integrated circuit made of lithium niobate ($LiNbO_3$) is in Y cross-section, the substrate of the optical integrated circuit made of lithium niobate ($LiNbO_3$) is in Z cross-section, the optical guides have been obtained by a titanium diffusion technique in a substrate of the circuit made of lithium niobate ($LiNbO_3$), the optical guides have been obtained by a proton exchange technique in a substrate of the circuit made of lithium niobate ($LiNbO_3$), the optical guides have been obtained by a titanium diffusion technique in a substrate of the circuit made of lithium niobate ($LiNbO_3$) with an X cross-section, the circuit is intended to operate in forward direction as a separator, the circuit is intended to operate in forward direction as a recombinator, the circuit is intended to operate in forward direction and/or in reverse direction as a separator/recombinator, the circuit is a Y-shaped optical separator/recombinator with two branches, the circuit is a Y-shaped optical separator/recombinator with three branches, one of the branches being central on the axis of symmetry of the optical guides of the circuit, the circuit is a Y-shaped optical separator/recombinator with four branches, the optical circuit comprises a separating unit and it is a Y-shaped optical separator/recombinator with at least two branches, the optical circuit comprises two cascaded, head to tail mounted separating units and it is an integrated Mach-Zehnder interferometer with at least two branches, the optical integrated circuit comprises two cascaded, head to tail mounted separating units and it is an integrated Mach-Zehnder interferometer with at least two branches, the optical integrated circuit comprises two cascaded, head to tail mounted separating units and it is an integrated Mach-Zehnder interferometer with four branches, the optical circuit comprises two cascaded, head to tail mounted separating units, electrodes in relation with the optical guides of the branches and it is an integrated Mach-Zehnder interferometrical modulator with at least two branches.

The advantages associated with the use of a junction according to the invention are multiple. First of all, reduction of the sources of losses and of optical instabilities relative to a conventional Y-junction: both sources of losses and of optical instabilities which are generated firstly at the insertion of an external optical signal in the input optical guide, hence at the interface, then secondly at the discontinuity into the conical zone in conventional circuits, are gathered thanks to the invention into a single source of optical losses, at the insertion and then constitutes a single optimization problem of the interface. Secondly, the optical structure suggested may advantageously improve the balance of the Y-junction. Indeed, the guiding input section which is formed of two (at least) substantially parallel and straight optical guides forms an optical superstructure hence the modal properties are equivalent to those of a single optical guide of width smaller than the sum of the widths of both optical guides taken separately. The straight input section acts hence as a monomode spatial optical filter which suppresses the spurious optical modes resulting from an imperfect injection between the external signal and the input guide and which are liable to modify the optical balance of the Y-junction. Thirdly, in terms of longitudinal space requirements, the gain is also noticeable since the adiabatic conical zone has disappeared to leave room for direct separation. The expression of the gain in space requirements relative to a conventional Y-junction is calculated according to the following formula: $X=(D+We1)/(2.\tan \alpha)$, and it can be noticed that the gain in room increases when the separation angle decreases. For instance for a separation semi-angle $\alpha=0.15°$, the longitudinal gain relative to a conventional Y-junction is of the order of 22%. The invention suggested enables hence to improve simultaneously numerous quality criteria of a Y-junction.

Figure 3:
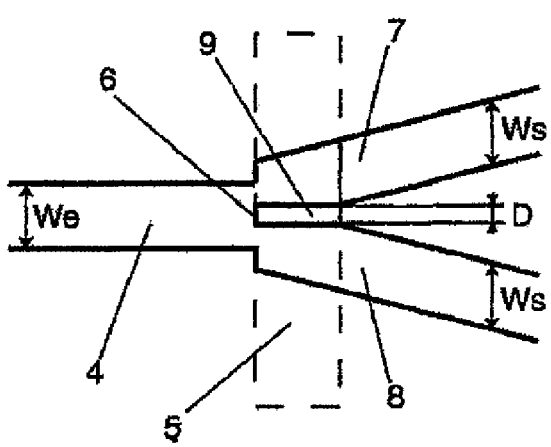
Figure 4:
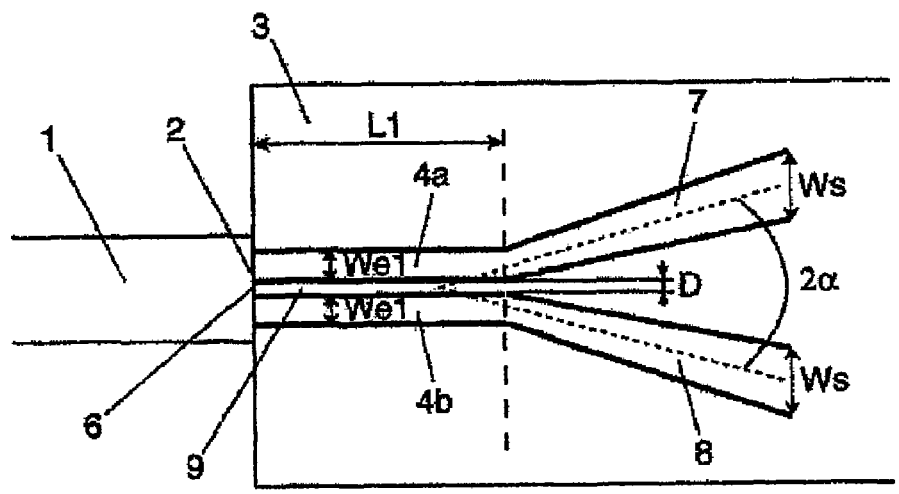
Figure 5:
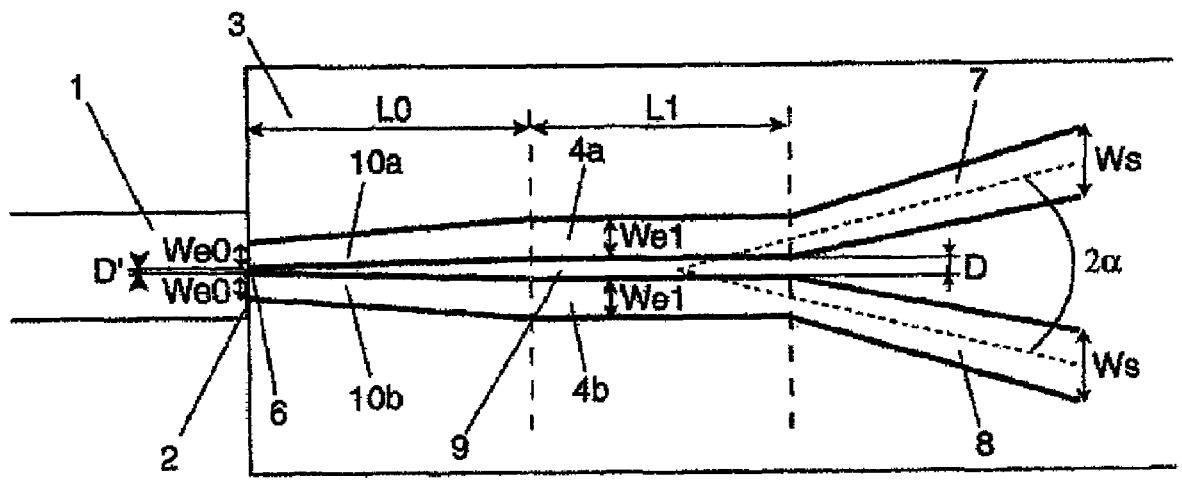
Figure 6:
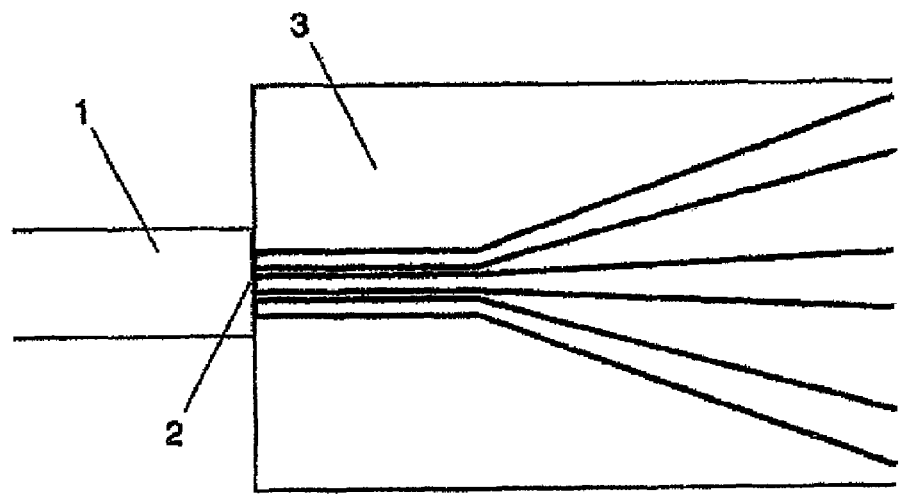
Figure 7:
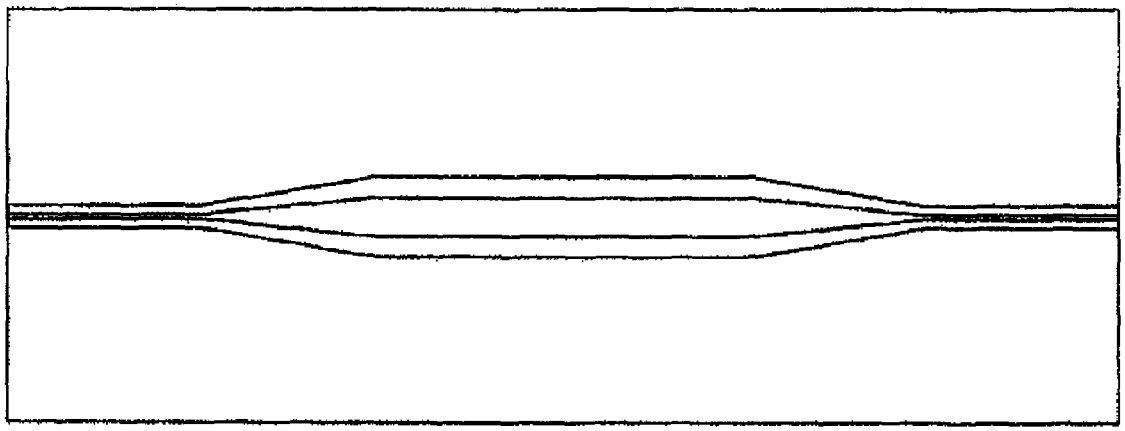
Figure 8:
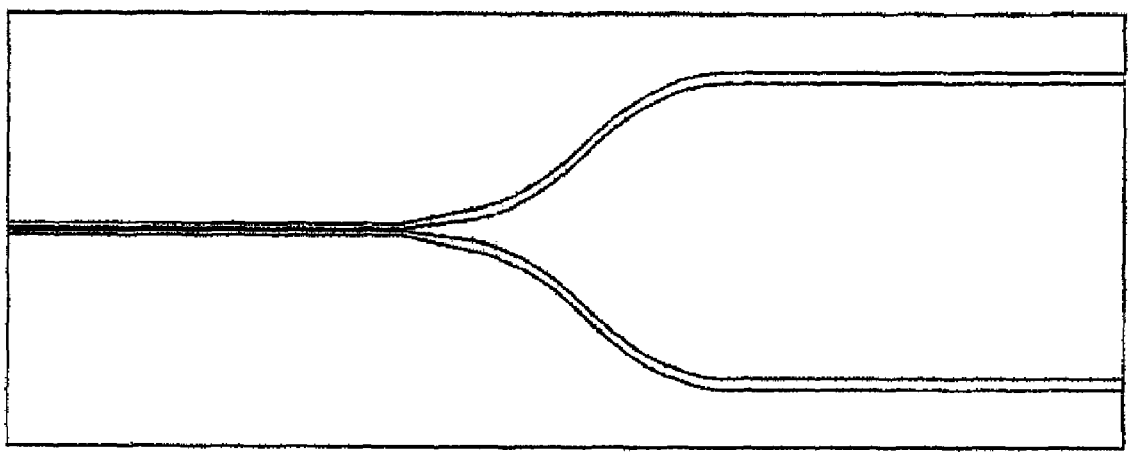
Figure 9:
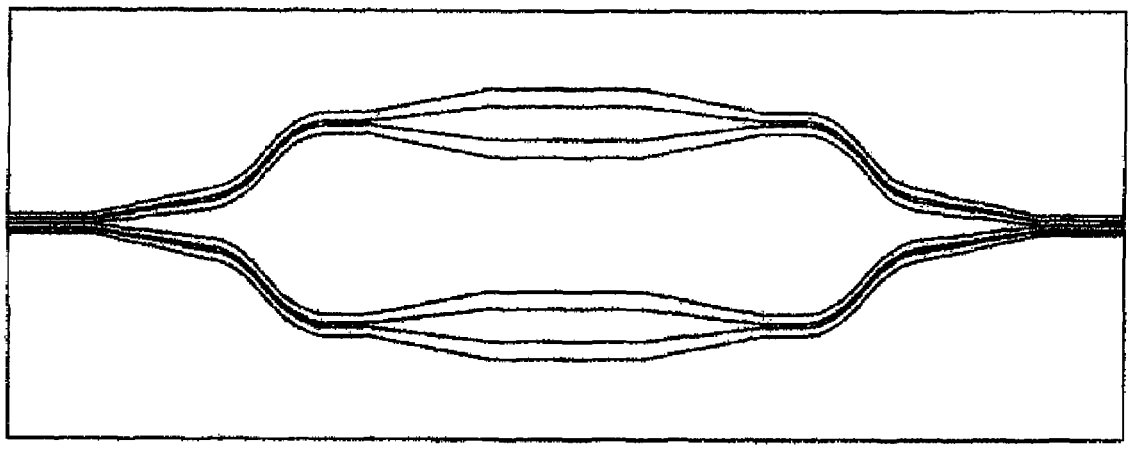
Figure 10:
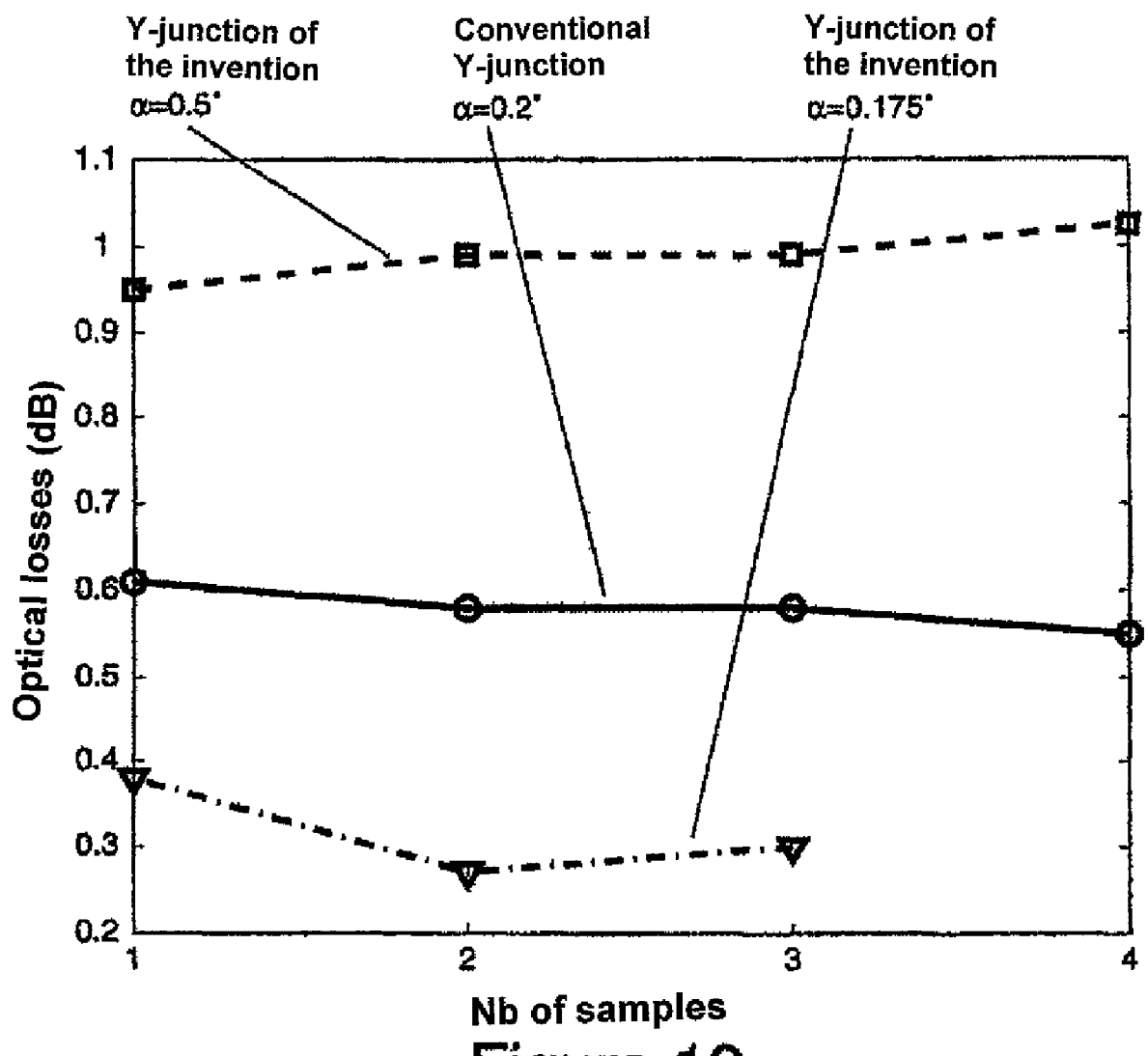

The present invention will now be exemplified without being limited thereto with the following description in relation with the figures below:

FIG. 1 of the state of the art representing diagrammatically a device with an optical fiber at input followed by an integrated optical circuit comprising a conventional Y-junction, FIG. 2 of the state of the art representing diagrammatically a Y-junction with an aperture in the conical zone, FIG. 3 of the state of the art representing diagrammatically a Y-junction with partial elimination of the conical zone and optical adaptation between the common optical guides and those of the branches, FIG. 4 which represents diagrammatically a device formed of an optical fiber at input and of an integrated optical circuit comprising a Y-junction type separating unit according to the invention, FIG. 5 which represents a device formed of an optical fiber at input and of an integrated optical circuit comprising a variation of the Y-junction type separating unit according to the invention, FIG. 6 represents a device formed of an optical fiber at input and of an integrated optical circuit comprising a three-output extension of the Y-junction according to the invention, FIG. 7 which represents a first application of Y-junctions according to the invention in a Mach-Zehnder type interferometer, FIG. 8 which represents a second application of Y-junctions according to the invention in an optical power separator and recombinator which may be used in particular in optical fiber gyrometers, FIG. 9 which represents a variation of FIG. 7 with placing in parallel two Mach-Zehnder type interferometers inside a main interferometer, and FIG. 10 which represents a series of comparative experimental measurements of optical losses of Y-junctions.

FIGS. 1 to 3 of the state of the art having been presented in the introductory section of the present document, the present invention will now be described in relation with FIG. 4. The Y-junction type device presented therein is formed by an integrated optical circuit on a substrate 3. An optical fiber 1 is bonded to the optical circuit. An optical transition is formed at the interface 2, which may be perpendicular as represented, preferably tilted (chamfered injection faces) to eliminate the spurious reflections between the optical fiber 1 and the ends of the optical guides 4a and 4b realized in the integrated optical circuit. The light of the optical fiber 1 which is injected on the input to the optical circuit at the interface 2 passes through the guides 4a and 4b of the integrated optical circuit and travels a guiding input section of length L1, both optical guides 4a and 4b in this input section being substantially straight and mutually parallel and each of width We1. On the interface 2 appears in the optical circuit a discontinuity 6 which is at the end of an aperture 9 separating both optical guides 4a and 4b of the input section, the aperture 9 and hence the discontinuity 6 at the end thereof, have a width D and optical properties different from those of the optical guides 4a and 4b. The refractive index of the discontinuity 6 and of the aperture 9 is smaller than that of the optical guides 4a and 4b. The width We1 of each optical guide 4a and 4b and the spacing D are adjusted so that the superstructure formed by the assembly of both guides 4a and 4b can only guide the fundamental optical mode at the working wavelength. The length of the input section L1 is fastened to suit the needs of stability and optical balance desired at output of the Y-junction. It may vary from 0 to several millimetres. Following the input section of length L1 lies zone for separating the branches formed by the gradual spacing away of an upper branch 7 and of a lower branch 8 of optical guides which are oriented by an angle ±α relative to the axis of symmetry carried by the general direction of the input section. The optical guides forming the branches 7 and 8 come apart from one another and widen gradually each to reach a final width Ws either to meet an output face of the integrated optical circuit, or to carry on their own paths with this width Ws. More generally speaking, the upper 7 and lower 8 branches represent the extension of the optical guides 4a and 4b and the separation zone may be interpreted as an evolution of the input optical superstructure where the internal parameters (widths of the optical guides and spacing between both optical guides) evolve during the propagation. In the case presented on FIG. 4, the evolution of the widths of the optical guides and of spacing between the optical guides is linear but in non-represented variations, non linear evolutions of the widths and/or spacing are considered.

The profile of the separation zone is designed so as to limit to the maximum, on the one hand the optical losses due to the coupling of the fundamental mode on the continuum of the radiating modes and on the other hand to the instabilities due to the coupling on higher order modes. The behaviour of light in such optical structures may be interpreted from the evolution of the optical supermodes. In this type of structures, the guided and radiating optical modes are linked by coupled propagation equations. The coupling coefficients of these equations are approximated by simplification of the continuous separation into a discrete series of abutting rectilinear sections. In such a case, the coupling coefficients are proportional to the overlaying integral between the optical modes at each elementary transition between the sections:

$$I_{mn}^{i \rightarrow i+1} = \int E_m^i E_n^{i+1}$$

where $E_m^i$ characterizes the amplitude of the m order optical mode into the section i, $E_n^{i+1}$ the amplitude of the n order optical mode into the section i+1 and $I_{mn}^{i \rightarrow i+1}$ the overlaying integral linked to the coupling coefficient of the m optical mode on the n mode.

It then becomes obvious that the number of optical modes liable to be guided defines the level of risk of coupling the energy of the fundamental mode on the higher order guided modes. The separation is then designed so as never to sustain more than two optical modes (fundamental and order 1 antisymmetrical mode). A digital resolution software of the propagation equations based upon the 'Beam Propagation Method' (BPM) may be used for simulating and estimating theoretically the optical losses as well as the possible coupling on higher order modes in this type of structure.

In such a case we refer to an adiabatic separation since the integrality of the energy of the fundamental optical mode at input is kept throughout the propagation in the separation. At separation output, the optical power is then shared in equal proportions on each of the branches 7 and 8. The separation zone, characterizing the second portion of the Y-junction, is a simple evolution of the initial optical superstructure where each optical guide widens and comes away relative to its neighbour. The width and coming-apart parameters are calculated in relation to predetermined criteria such as optical losses and space requirements. This second portion of the Y-junction is then inscribed in the extension of the initial portion. In other words, the Y-junction of the invention may be perceived as a symmetrical optical structure whereof the upper and lower branches are stretched up to the input to the integrated optical circuit.

FIG. 5 exhibits a device implementing a realization variation of an integrated optical separation on an optical circuit. In this variation, the initial portion of the optical guides is provided with a zone for gradual adjustment of the width and of the distance between them so as to find the best compromise between the optical losses by dis-adaptation of shape with the external signal coming from an optical fibre for instance, the propagation losses and the monomode spatial optical filtering. The latter structure stems from the hypothesis that the geometrical conditions of the optical superstructure promoting optical overlaying at the interface between the fibre and the integrated optical circuit will not always match the optimal geometrical conditions of propagation optical losses in the initial portion of the Y-junction. The light coming from an optical fiber 1 is injected at the input to the integrated optical circuit on a substrate 3 at the interface 2 forming the transition zone. The initial optical superstructure preceding the spacing-apart zone of both branches is divided into two sections, first section of length L0 then second section of length L1. The first section is a transition zone which acts as an optical adaptor between the optical signal derived from the fibre 1 and the guided fundamental optical mode of the second section. This first section is formed of two upper 10a and lower 10b optical guides matching those respective ones of the second section, then, their respective branches and whereof the widths vary of We0 at the interface 2 forming the transition zone, to We1 at the input to the second section. In parallel, the aperture 9 between the guides sees its value evolve from D' at the interface 2 forming the transition zone to D at the input to the second section (D'<D). The initial dimensions of the optical superstructure, We0 and D', are adapted in order to minimize the insertion optical losses with the external signal coming from the optical fibre.

Optimization consists in maximizing the covering rate between the distributions of the electrical fields at the interface 2:

$$\eta = \frac{\left|\int E_1 E_2^*\right|}{\int |E_1|^2 \int |E_2|^2}$$

where $E_1$ and $E_2$ correspond respectively to the amplitude of the optical mode of the fibre and to the amplitude of the fundamental optical mode of parameters We0 and D'. The values are restricted between 0, in the worst case, and 1, in the case of a perfect superimposition between the optical fields. The optical modes and the covering rate may be calculated using a digital resolution software based upon the finite difference method.

The second section is used for filtering spatially the spurious optical modes liable to be energized by injecting light from the optical fiber while confining sufficiently the fundamental optical mode so as not to generate additional optical losses. This second section is formed of two parallel optical guides which will match their respective upper 4a and lower 4b branches. The length L1 and the parameters We1 and D characterizing the monomode spatial filter are calculated so as to minimize the instabilities such as the optical unbalance between the branches 7 and 8.

The corresponding optimization process makes use of digital simulation tools such as the 'beam propagation method'. The principle consists in reproducing an imperfect injection of light by offsetting by a few micrometres the transversal centre of the fibre relative to the centre of the injection guide. The unbalance at output between the arm 7 and 8 is then calculated by the formula P7/(P7+P8) or P8/(P7+P8) then a limit is set according to the room available on the circuit and the alignment tolerances. It can be noted however that the greater the distance L1 the better the balance between the output arms.

In the separation zone of the branches 7 and 8, the optical guides associated with the upper 7 and lower 8 branches come apart while being oriented by an angle ±α relative to the axis of symmetry of the optical guides of the circuit. Their respective widths evolve from We1 to Ws as previously.

Thus, the invention in its general concept relates to an optical integrated circuit on a planar substrate comprising optical guiding means forming at least one optical separation called Y-junction. The optical guiding means of the initial portion of the Y-junction are formed of many parallel optical guides as branches at output of the Y-junction. This initial portion preparing the separation of the branches forms an optical superstructure whereof the geometrical features, such as the width and the distance for separating the parallel optical guides, are selected so as to verify the conditions of monomodality and adaptation to the optical signal from the outside to the integrated optical circuit.

The principle for separating the optical guide developed for a Y-junction fitted with an inlet and two outlets may be extrapolated to an inlet and multiple outlets within the limit of the resolutions reachable by the technology. In order to illustrate the extrapolation principle to N outputs of the invention, an example is given on FIG. 6 with a device called separator 1 toward 3. The external signal derived from the optical fiber enters the integrated optical circuit 3 through the optical superstructure composed of three parallel optical guides. The structural parameters such as the width and the spacing between the optical guides are adapted so as to render the optical superstructure compatible with the optical mode of the input fibre and so that the circuit only supports the fundamental guided optical mode. In all the possible variations it should be borne in mind that the performed structure is essentially symmetrical.

The device exemplified until now relates to an optical integrated circuit on a substrate with at least one Y-junction operating in forward direction, i.e. as an optical guide separator, but the principle remains applicable to a Y-junction operating in reverse direction, i.e. as an optical guide recombinator. Thus, the invention is liable to find numerous practical applications in integrated optical circuits with the most diverse functionalities and several examples are given on FIGS. 7, 8 and 9.

FIG. 7 exhibits a first example of application with an optical integrated circuit on a substrate with two Y-junctions of the invention arranged in cascade, head to tail, and connected to one another. The first junction acts as a divider (separator) of optical power while the second acts as an optical power recombinator. The resulting global optical structure forms an interferometer called integrated Mach-Zehnder interferometer. In such a case, the invention offers an additional advantage with respect to the conventional Y-junctions since the monomode spatial optical filter which partook of enhanced stability in forward operation may prove useful, in reverse operation, of enhanced extinction rate. The radiating anti-symmetrical optical mode at recombinator output is diffracted more easily outside the optical guide thanks to a smaller equivalent guide width.

FIG. 8 exhibits a second example of application with an integrated optical circuit which may be used as a divider/recombinator, in particular pour applications in optical fibre gyrometers based upon the Sagnac interferometric effect.

FIG. 9 exhibits a third example of application with an integrated optical circuit which uses as a main base the circuit of FIG. 8. The optical structure is nevertheless more complex since each branch of the first Mach-Zehnder is the seat of an second structure of the same type obtained by splitting.

These examples with cascading several Y-junctions and/or splitting are a simple demonstration of the implementation possibilities of the invention.

It should be noted that as the geometrical dimensions of the Y-junction being adaptable, the integrated optical circuit of the invention may apply to any optical wavelength as long as light is guided in the circuit.

Among the possible modalities for realizing the optical integrated circuit the use of any type of substrate may be considered as long as the latter is liable to support optical guides. Thus, the invention applies, among other things, to optical circuits integrated on glass, on semi-conductors, on polymers, on ferroelectric materials such as lithium niobate (LiNbO3) or lithium tantalate (LaTiO3). The particular case which is presented by way of example relates to the application of the invention to an integrated optical circuit on a lithium niobate substrate.

Lithium niobate is a crystal used currently for the manufacture of active integrated optical circuits based upon the electro-optical or acousto-optical effect. Among its properties, one will observe that it belongs to the class of uniaxial birefringent crystals: the crystallographic axis Z corresponds to the optical axis, noted as extraordinary axis with index Ne, while both other axes, X and Y correspond to the ordinary axe with index No. In practice, the optical guides are manufactured in surface on substrates which may have the three main crystallographic orientations, i.e. the so-called 'X sectional' substrates, whereof the axis X is perpendicular to the surface, so-called 'Y sectional', whereof the axis Y is perpendicular to the surface, which are known for their temperature stability, or so-called 'Z sectional', whereof the axis Z is perpendicular to the surface, which are characterized by depending strongly on the pyro-electrocal effect but also by better electro-optical efficiency.

Currently, two technologies applied at industrial scale enable to manufacture optical guides on lithium niobate: titanium diffusion and proton exchange. It should be noted that other less conventional manufacturing techniques such ion implantation or lithium niobate etching may also suit the invention.

Titanium diffusion is a method consists in raising locally the refractive indices Ne and No by doping the crystallographic array of the host, in this case LiNbO3. The doping is realized by very high temperature thermal diffusion, typically of 900° C. to 1150° C. Proton exchange is a method consisting in local elevation of the extraordinary index Ne via a substitution chemical reaction. By making lithium niobate contact hot acid, pure or diluted, the lithium ions of the crystal close to the surface are gradually replaced with protons. After the exchange operation, the substrate may be annealed for softening and stabilizing the index profile.

In order to check the validity of the suggested invention, several integrated optical circuits comprising different Y-junctions have been realized on lithium niobate. The pattern of the optical circuit selected corresponds to that of FIG. 7, i.e. a Mach-Zehnder interferometer. The optical guides have been obtained by the titanium diffusion technique on an X-sectional lithium niobate substrate.

The different optical circuits have been realized within a single board so as to guarantee identical treatment. The geometrical parameters such as We1, D and Ws have been set on the basis of previous tests and in the present case only the separation angle and the type of Y-junction vary from one circuit to another.

FIG. 10 gives the optical losses per Y-junction upon completion of the tests at the wavelength of 1550 nm. The estimate of the optical losses per Y-junction is obtained by subtracting the optical losses of the Mach-Zehnder interferometers from the optical losses of reference rectilinear guides then by dividing by the number of Y-junctions, two in the present case. The curve as a dotted line with the squares corresponds to the measuring results on conventional Y-junctions having a semi-angle $\alpha$ for separation $\alpha=0.5°$. The losses per junction are estimated in average as 0.99 dB. The continuous curve with the circles represents the measurements of conventional Y-junctions having a semi-angle $\alpha$ of smaller separation, typically $\alpha=0.2°$. The losses per Y-junction are estimated in average as 0.58 dB. The curve with intermittent dashes with the triangles is associated with the measurements made on the Y-junctions of the invention with a semi-angle α for separation α=0.175°. The average losses amount to 0.31 dB per junction.

Table 1 below gives a comparison of the performances of the Y-junctions manufacture on the base of the selection criteria such as geometrical space requirements, optical losses and, indirectly, monomode spatial optical filtering by the extinction rate:

TABLE 1

|  | conventional Y-junction | conventional Y-junction | Y-junction of the invention |
|---|---|---|---|
| α | 0.5° | 0.2° | 0.175° |
| Longitudinal space requirements | −60% | 0% | −11% |
| Optical losses | 0.99 dB | 0.58 dB | 0.31 dB |
| Extinction rate | 25 dB | 22 dB | 25 dB |

In this table 1, the conventional Y-junction with α=0.2° is selected as reference Y-junction for space requirements.

The conventional Y-junction with a semi-angle α of 0.5° enables to save 60% made of longitudinal space requirements but to the detriment of optical losses. Conversely, the Y-junction of the invention enables to save 11% on space requirements even with a smaller separation semi-angle (0.175° instead of 0.20°). The optical losses also decrease relative to the reference.

The experimental results show that the Y-junction of the invention enables to save simultaneously on space requirements and optical losses whereas a conventional Y-junction may only improve one of both criteria at a time. With equivalent space requirements, the results obtained show the efficiency of the Y-junctions of the invention. The performances displayed reflect combined improvement of the fibre/guide coupling efficiency (gain of 0.15 dB obtained by optical simulation), a reduction in the radiating optical losses by suppressing the discontinuity of the optical guide at separation and by minimization of the separation angle 2α between both branches.

In the Mach-Zehnder type intensity modulators, the extinction rate translates the efficiency of the monomode spatial optical filtering of the foot of the Y-junction. This rate is expressed as the ratio in decibels between the passing and blocking optical levels. The conventional Y-junctions with a semi-angle of 0.5° are currently used for obtaining high extinction rate (25 dB). It can be noticed in table 1 that when this angle α changes from 0.5° to 0.2°, the optical losses do improve but the extinction rate degrades by 3 dB (22 dB). In order to regain equivalent performances, the foot of the Y-junction should be lengthened so that the radiating antisymmetrical optical mode is diffracted more efficiently in the substrate. Simultaneous improvement of the optical losses and of the extinction rate of a conventional Y-junction implies unacceptable increase in its geometrical dimensions. The Y-junction of the invention exhibits a different behaviour since the extinction rate remains high and equivalent to that of the conventional junction with a 0.5° separation semi-angle, even with a small separation semi-angle α=0.175°. This phenomenon is due to a smaller equivalent guiding width of the foot of the Y-junction resulting from the invention. The radiating anti-symmetrical mode is diffracted more easily in the substrate during its propagation.

In conclusion, when the aperture angle is fixed, the Y-junction of the invention proves more performing than the conventional Y-junction, as well as regards space requirements, optical losses or monomode spatial optical filtering. The experimental results obtained on Mach-Zehnder interferometers put in evidence the impact that the Y-junctions of the invention may exert and it becomes obvious these deviations in performances will be increase with the number of cascaded Y-junctions.

The invention claimed is:

1. An optical integrated circuit with waveguide separation on a substrate (3), the circuit comprising at least one optical separating unit, the unit comprising an optical input/output interface (2) at the edge of the substrate intended for being in relation with an external means for guiding a light wave, the interface extending in the circuit through an optical guiding input section of determined length L1 extended by at least two optical guiding branches (7, 8) mutually spaced apart substantially symmetrically relative to the general direction of the input section, characterised in that the input section from the interface at the edge of the substrate includes as many optical guides (4a, 4b) as there are branches, each of the optical guides being continuous from the interface at the edge of the substrate up to its corresponding branch inclusive, the optical guides of the input section being substantially rectilinear and mutually parallel, two adjacent optical guides of the input section being separated by an aperture (9) of determined width D, the refractive index of the opening being lower than that of the optical guides, each optical guide of the input section having a determined width We1, and in that each branch optical guide exhibits a width increasing in the direction away from the input section from the width We1 up to a determined width Ws, the widths We1 and D being such that the guides are monomode at the working wavelength.

2. An optical integrated circuit according to claim 1, characterised in that the unit includes moreover a transition zone of length L0 between the interface and the input section, wherein the transition zone includes optical guides (10a, 10b) continuous with those of the input section (4a, 4b), each of the optical guides of the transition zone having a width increasing in the direction away from the interface from a determined width We0 up to the width We1, and in that the opening (9) between two adjacent optical guides of the transition zone has a width increasing in the direction away from the interface from a determined width D' up to the width D.

3. An optical integrated circuit according to claim 1, characterised in that the variation in width of the optical guides of the branches is linear in relation to the distance of propagation.

4. An optical integrated circuit according to claim 1, characterised in that the length L1 of the input section ranges between 0 excluded and 10 mm.

5. An optical integrated circuit according to claim 1, characterised in that in the case of two branches the semi-angle α for separating the branches ranges between 0.1° and 0.50° and is preferably about 0.175°.

6. An optical integrated circuit according to claim 1, characterised in that the external guiding means is an optical fiber (1) bonded to the interface of the optical integrated circuit.

7. An optical integrated circuit according to claim 1, characterised in that the substrate of the optical integrated circuit is made of lithium niobate (LiNbO3).

8. An optical integrated circuit according to claim 1 characterised in that it comprises a separating unit and that it is a Y-shaped optical separator/recombinator with at least two branches.

9. An optical integrated circuit according to claim 1, characterised in that it comprises two cascaded, head to tail mounted separating units and that it is an integrated Mach-Zehnder interferometer with at least two branches.

10. An optical integrated circuit according to claim 2, characterised in that the variation in width of the optical guides of the branches is linear in relation to the distance of propagation.

11. An optical integrated circuit according to claim 2, characterised in that the length L1 of the input section ranges between 0 excluded and 10 mm.

12. An optical integrated circuit according to claim 3, characterised in that the length L1 of the input section ranges between 0 excluded and 10 mm.

13. An optical integrated circuit according to claim 2, characterised in that in the case of two branches the semi-angle α for separating the branches ranges between 0.1° and 0.50° and is preferably about 0.175°.

14. An optical integrated circuit according to claim 3, characterised in that in the case of two branches the semi-angle α for separating the branches ranges between 0.1° and 0.50° and is preferably about 0.175°.

15. An optical integrated circuit according to claim 4, characterised in that in the case of two branches the semi-angle α for separating the branches ranges between 0.1° and 0.50° and is preferably about 0.175°.

16. An optical integrated circuit according to claim 2, characterised in that the external guiding means is an optical fiber (1) bonded to the interface of the optical integrated circuit.

17. An optical integrated circuit according to claim 3, characterised in that the external guiding means is an optical fiber (1) bonded to the interface of the optical integrated circuit.

18. An optical integrated circuit according to claim 4, characterised in that the external guiding means is an optical fiber (1) bonded to the interface of the optical integrated circuit.

19. An optical integrated circuit according to claim 5, characterised in that the external guiding means is an optical fiber (1) bonded to the interface of the optical integrated circuit.

20. An optical integrated circuit according to claim 2, characterised in that the substrate of the optical integrated circuit is made of lithium niobate (LiNbO3).

* * * * *